July 24, 1962  R. H. ALBRIGHT  3,046,422
COAXIAL METAL ENCLOSED ISOLATED PHASE BUS
Filed Oct. 5, 1959  4 Sheets-Sheet 1
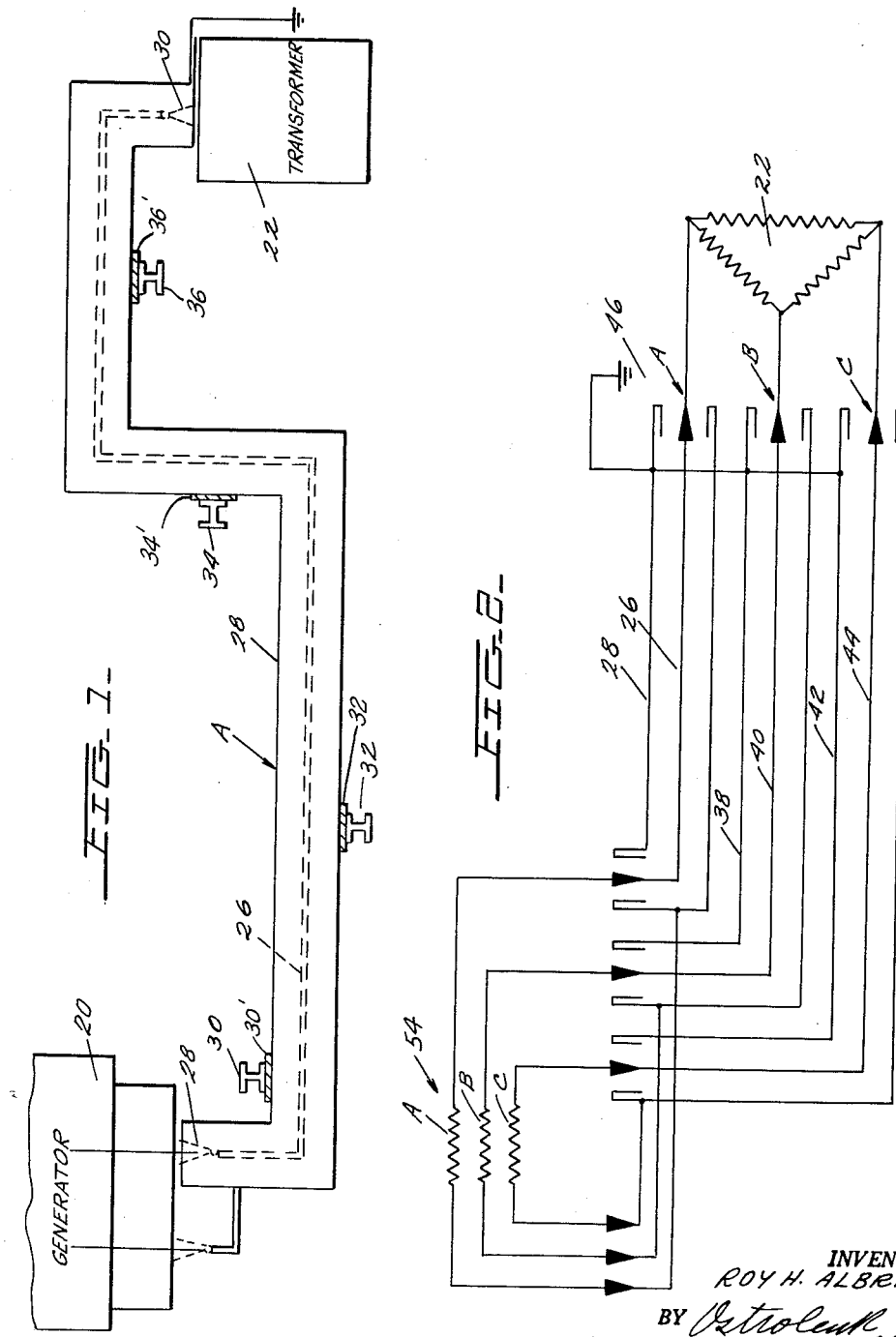
INVENTOR.
ROY H. ALBRIGHT
BY Ostrolenk, Faber,
Gerb & Soffen
ATTORNEYS

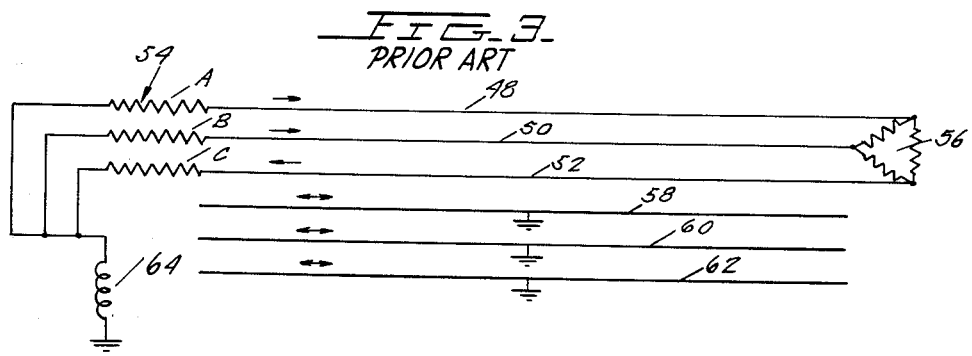
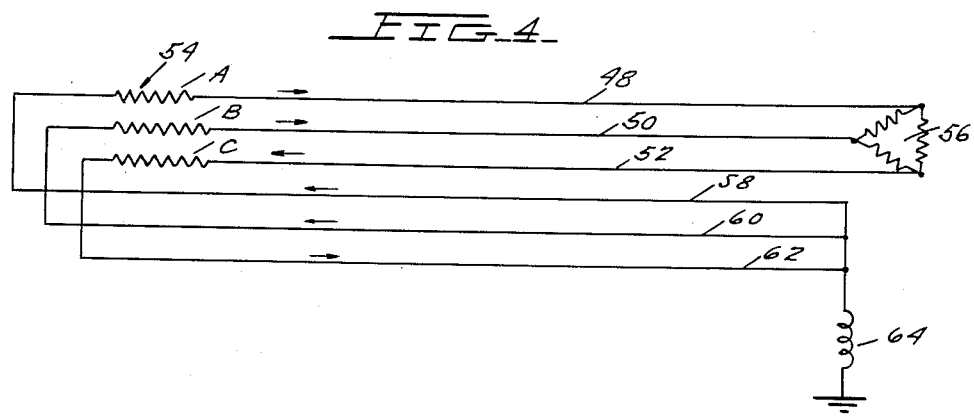

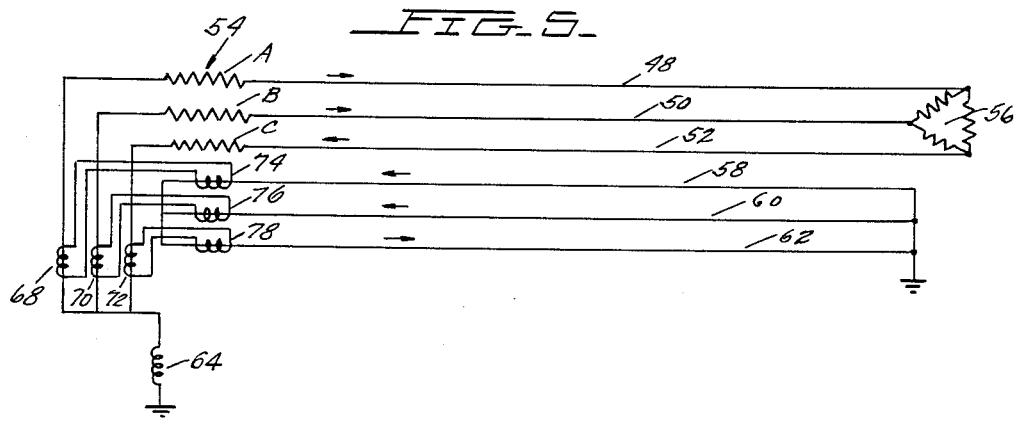
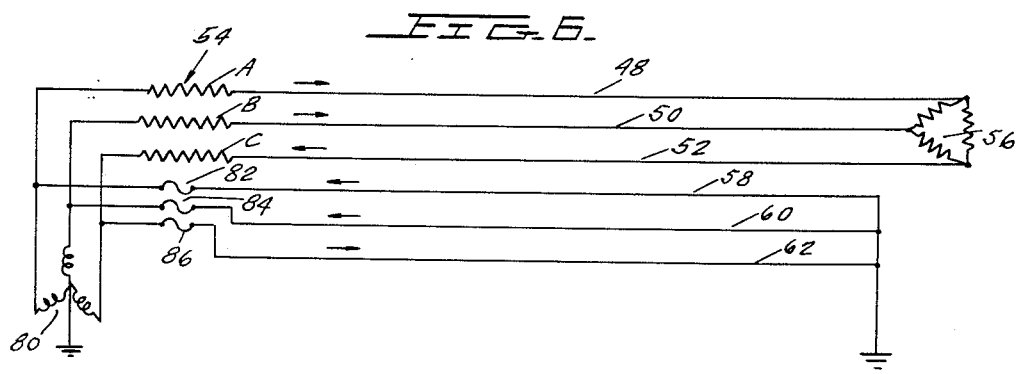
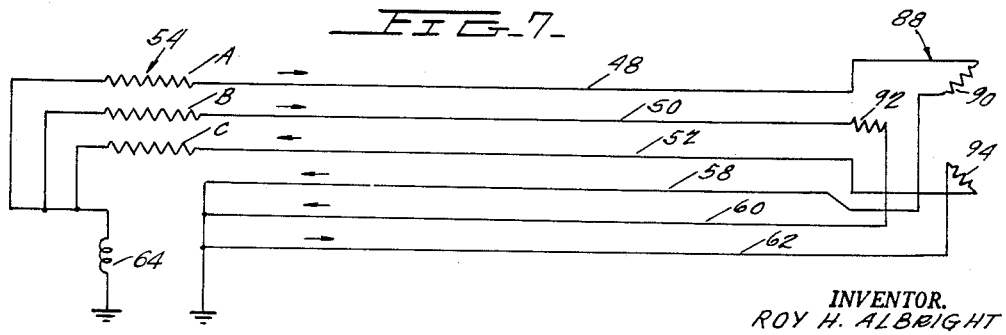

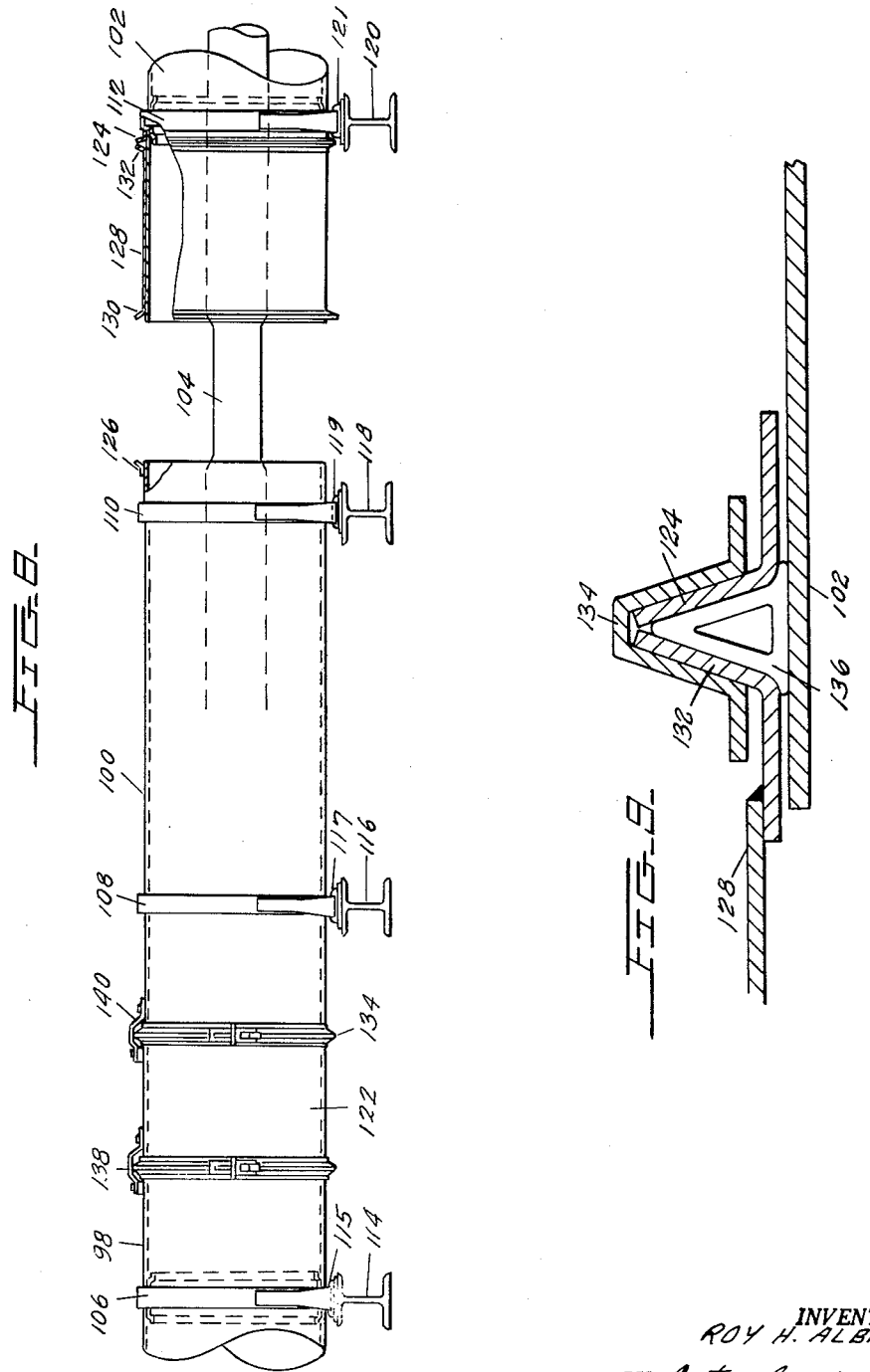

United States Patent Office 3,046,422
Patented July 24, 1962

3,046,422
COAXIAL METAL ENCLOSED ISOLATED PHASE BUS
Roy H. Albright, Greensburg, Pa., assignor to I-T-E Circuit Breaker Company, Philadelphia, Pa., a corporation of Pennsylvania
Filed Oct. 5, 1959, Ser. No. 844,455
4 Claims. (Cl. 307—147)

My invention relates to isolated phase bus structure wherein the bus housing has electrical continuity and serves as a return conductor to carry currents of equal magnitude and reverse direction to the currents of the corresponding phase conductor connected internally of the enclosure.

Isolated phase bus structures are well known in the art, and are typically shown in U.S. Patent No. 2,706,744 to Rudd, issued April 19, 1955, and Patent No. 2,783,299 to Schymik, dated February 26, 1957, and my copending application Serial No. 609,744, filed September 13, 1956 entitled High Voltage Bus Structure and issued as U.S. Patent 2,944,101 on July 5, 1960, and assigned to the assignee of the present invention.

It is well known that even when the phase buses of an electrical system are isolated from one another by metallic housings, there are still many undesirable characteristics which cannot be eliminated.

One of the undesirable characteristics is that circulating currents are induced in the metallic housings, since the magnetic fields surrounding the individual conductors are non-uniform due to the close proximity of other phases whereby there is a loss of power and increased temperature of the enclosures.

A second undesirable characteristic is that there are unequal reactances between the individual phases so that the voltages at the output end of the bus structure are unbalanced.

A further objectionable feature is that circulating currents are set up in structural members adjacent the bus structure due to induced voltages in these structural members.

The general practice followed in isolated phase bus construction is to support individual phase conductors within separate metal enclosures which are round or square by means of insulators which extend internally of the housing to the centrally positioned conductor. The enclosures are then connected in sections of varying lengths with insulation between the sections in order to electrically isolate them. The enclosure sections are then mounted on parallel or transverse structural members to place the three phases in a common plane, or any other desired configuration, where the enclosure sections are insulated from the transverse supporting members, except at one point.

The bus enclosures are normally of a high conductivity material such as aluminum, and are necessarily of a large diameter and substantial wall thickness to attain rigidity so that the cross-sectional area of the housing normally has an equal or greater current carrying ability than the conductors which they enclose.

I have found that by avoiding the universally followed practice of insulating the housing sections and by forming the sections to be electrically continuous I can now use them not only for isolation purposes, but also for current carrying purposes where the housings serve as a return electrical path.

Accordingly, the enclosures which are concentric about the conductors carry a current through the enclosures equal in magnitude to the central conductor current but in a reverse direction so that the magnetic field surrounding the combined conductor and enclosure is substantially zero. This, of course, is the theory practiced in the coaxial cable art, which is almost primarily concerned with very high frequencies. I have adapted this theory, however, for isolated phase bus structures which seldom operate beyond the extremely low frequency of 60 cycles per second, and at powers which may be 10,000 times as great as the power capacities involved in the non-analogous coaxial conductor field.

Accordingly, the primary object of my invention is to provide a novel isolated phase bus structure.

Another object of this invention is to provide a novel isolated phase bus structure wherein the metal enclosure serves as a return conductor.

A further object of this invention is to substantially reduce circulating currents in structural members supporting isolated phase bus structures.

A still further object of this invention is to provide an isolated phase bus structure in which the reactance of all phases of a multi-phase system are substantially equal, and the voltage drops in all of the phases are substantially equal.

Yet another object of this invention is to provide an isolated phase bus structure wherein short circuit stresses are substantially decreased by causing the enclosure to carry current of equal magnitude and opposite direction to that carried by the central conductor.

A still further object of this invention is to provide an isolated phase bus structure wherein the power loss is substantially decreased.

Yet another object of this invention is to provide a more economical use of the conductive materials of the enclosure of an isolated phase bus conductor by causing the enclosure to be a return conductor.

Still another object of this invention is to form the enclosure of an isolated phase bus structure as a return conductor path to achieve uniform field distribution.

These and other objects of my invention will become apparent from the following description when taken in connection with the drawings, in which:

FIGURE 1 is a schematic top plan view of one of a plurality of isolated phase conductors interconnecting a generator and transformer where the isolated phase bus is constructed in accordance with the invention.

FIGURE 2 schematically shows all three phases interconnecting the transformer and generator of FIGURE 1.

FIGURE 3 is a schematic diagram of a conventional metal enclosed isolated phase bus structure as presently used.

FIGURE 4 shows how the conventional structure of FIGURE 3 is modified in accordance with the present invention.

FIGURE 5 shows an embodiment of the present invention wherein the generator neutral is grounded through a distribution-type transformer.

FIGURE 6 shows a further embodiment of the invention wherein a three-phase distribution transformer is connected in the generator neutral.

FIGURE 7 shows still a further embodiment of the invention wherein the main transformer has Y-connected low voltage windings.

FIGURE 8 is a plan view of an enclosure section of bus constructed in accordance with the present invention.

FIGURE 9 is a cross-sectional view of the cover clamp for the bus section of FIGURE 8.

Referring now to FIGURE 1, I have schematically shown a top plan view of a generator 20 which is to be connected to a remotely positioned transformer 22 by a plurality of isolated phase conductors which may be directed in a tortuous path to avoid obstacles between generator 20 and transformer 22.

The complete electrical circuit of the structure of FIGURE 1 is shown in FIGURE 2 for each of the three phases A, B and C, while FIGURE 1 shows only phase A. Phase A of FIGURES 1 and 2 is comprised of a central conductor 26 which is connected from terminal bushing 28 of generator 20 to terminal bushing 30 of transformer 22. The housing 28, which is a metallic housing surrounding conductor 26, is electrically continuous, and will carry a current in opposition to the current carried by conductor 26.

It will be noted that housing 28 is supported from transverse I-beam members 30, 32, 34 and 36 where the I-beams are electrically insulated from the continuous conductor housing 28. The housing 28 is insulated from the I-beams 30, 32, 34, 36 by insulating means 30', 32', 34', 36' positioned between the I-beams 30, 32, 34, 36 respectively and the housing. The cross-sectional area of the electrical housing will, of necessity (because of rigidity requirements), be substantially equal to or greater than the cross-sectional area of central conductor 26 whereby the current density of the housing 28 will be relatively low.

The remaining phases B and C of generator 20 are constructed in the same manner as phase A of FIGURE 1, and are seen in FIGURE 2 as comprising electrically continuous housing 38 and central conductor 40 for phase B, and electrically continuous housing 42 and central conductor 44 for phase C. Each of the central conductors 26, 40 and 44 are then electrically connected to the delta-connected transformer winding, while the left-hand terminal of generator phases A, B and C are electrically connected to housings 42, 38 and 28 respectively. That it to say, the generator neutral leads are connected to the generator ends of the individual phase housings, and a neutral tie is made between housings 28, 38 and 42 at the transformer ends of the housing, and is grounded at ground 46. This assures that the individual phase conductors and housings carry the same magnitude of current in opposite directions.

FIGURE 3 shows the conventional type of metal enclosed isolated phase bus structure as currently used where conductors 48, 50 and 52 are the conductors of the three-phase system for connecting phases A, B and C of generator 54 to transformer 56. Each of conductors 48, 50 and 52 have concentric housings associated therewith which are schematically illustrated in FIGURE 3 by lower conductors 58, 60 and 62 where conductor 58 is physically concentric with conductor 48; housing 60 is physically concentric with conductor 50 and housing 62 is physically concentric with conductor 52. The neutral conductors of generator 54 may then be either solidly grounded, or, as shown in FIGURE 3, may be grounded through a reactor 64, where the reactor grounding is used to absorb a certain amount of voltage under fault conditions so that the generator windings will not be subjected to full fault current.

It is to be clearly noted that in FIGURE 3, the enclosures 58, 60 and 62 of the prior art are electrically isolated from the transmission circuit, and each of the enclosures is individually grounded, as shown.

The relative current directions are illustrated in FIGURE 3 by the arrows where, at some particular instant, current flow in conductors 48 and 50 is to the right, while current flow in conductor 52 is to the left. The current in housings 58, 60 and 62 is only the circulating current induced in the housings, and it is a current which circulates longitudinally back and forth, as illustrated by the double ended arrows. Thus, at any moment, the circulating currents in a phase cover will be in both directions, while the conductor current in the same phase is only in one direction.

In accordance with the present invention, and as shown in FIGURE 2, the system of FIGURE 3 may be modified, as illustrated specifically in FIGURE 4.

In FIGURE 4, components similar to those of FIGURE 3 have been given like numerals. As in FIGURE 3, enclosures 58, 60 and 62 of FIGURE 4 physically enclose their respective central conductors 48, 50 and 52. In FIGURE 4, however, and in accordance with the invention, housings 58, 60 and 62 are part of the generator circuit, and carry current of the same magnitude but opposite direction to the current carried by their respective phase conductor. Thus, for phase A, the current in housing 58 is equal in magnitude but opposite in direction to the current in conductor 48. In a like manner, housings 60 and 62 are electrically connected in the generator circuit to carry currents equal and opposite to the currents carried by the respective central conductors 50 and 52.

In order to ground the generator 54 and connect the bus housings 58, 60 and 62 in the generator circuit, the ground is connected through reactor 64 which is electrically connected to the right-hand end of enclosures 58, 60 and 62, as shown.

A modification of the novel invention shown in FIGURE 4 is set forth in FIGURE 5 where the generator neutral is connected to ground through reactor 64, as shown in FIGURE 3, while current is induced in the individual housings 58, 60 and 62 by transformers having primary windings 68, 70 and 72 connected in the generator neutral leads and secondary windings 74, 76 and 78 respectively connected to induce current flow in housings 58, 60 and 62, as by being wound on a magnetic core surrounding the left-hand end of the respective housings. The right-hand end of the housings is then connected to ground, as shown.

In this type of arrangement, the secondary voltage at windings 74, 76 and 78 may be relatively small to induce currents of equal magnitude and opposite direction to those flowing in the respective central conductors 48, 50 and 52. Furthermore, in this type of structure, fault currents are limited by the grounding reactor 64 and transformer primary windings 68, 70 and 72.

A further embodiment of the invention whereby the phase enclosures are used as a part of the generator circuit is set forth in FIGURE 6 where a three-phase distribution transformer 80 is connected to the generator 54. Transformer 80 has a Y-connected winding, the neutral of which is grounded, and the right-hand end of housings 58, 60 and 62 are also connected to ground, as shown.

The left-hand end of enclosures 58, 60 and 62 are connected to transformer 80 by a conductive strap means, if desired, where the conductive strap means includes a fuse, such as fuses 82, 84 and 86, which are connected in series with housings 58, 60 and 62 respectively. Normally, in the circuit of FIGURE 6, phase current will be passed through the covers 58, 60 and 62 to the neutral tie at the transformer end or the right-hand end of the enclosures. In case of a fault, the fuses (or any desired type of interrupting device) would open, and the fault current would pass through the transformer 80 to ground. Current limiting reactors could, of course, be used in the circuits between the neutral leads and the bus enclosures to reduce the magnitude of the fault current in the usual manner.

A further modification of my novel circuit is set forth in FIGURE 7 where the main transformer 88 is comprised of Y-connected low voltage windings 90, 92 and 94 for phases A, B and C respectively. In this case, the neutral tie for the transformer windings is completed at the generator end or left-hand end of the enclosures 58, 60 and 62, while the neutral generator leads are connected to ground as through the grounding reactor 64 in the manner illustrated in FIGURE 3.

The various embodiments set forth above all illustrate manners in which currents can be passed through the bus conductor housings where the currents are always of substantially equal magnitude, but opposite in direction to the currents carried by their central phase conductor.

In each of the embodiments, the operation of the bus system is improved in many respects. For example, circulating currents in structural members such as the transverse structural members 30, 32, 34 and 36 of FIG- URE 1 are either reduced to a negligible value, or are eliminated entirely.

Secondly, the reactance in all three phases will be equal. Therefore, the voltage drops in all three phases will be equal, and no voltage unbalance will occur.

Next, short circuit stresses between phases will be minimized, since the resultant force due to equal but reverse currents in the individual phase housings and conductors will be theoretically zero.

Further, power loss in the bus structures will be kept to a minimum, since the losses will be confined to the losses in the conductors and covers alone. Furthermore, a more economical use of conducting materials would follow because of the uniform field distribution which allows a uniform distribution of current in the conductors.

One physical structure which could be used to practice the present invention is set forth in FIGURE 8 which shows typical enclosure sections 98, 100 and 102 which carry a central conductor 104 from insulators (not shown) which extend from the internal surfaces of the enclosures to the bus 104, in order to support the bus 104 in a central position. The housings are then provided with support rings, such as rings 106, 108 and 110 and 112 which are securely connected to the enclosures, and are provided with mounting feet in any desired manner for mounting to transverse structural supports, such as I-beams 114, 116, 118 and 120. The covers are insulated from the I-beams by insulating pads 115, 117, 119 and 121 positioned between I-beams 114, 116, 118 and 120 respectively and their respective rings.

In order to permit physical inspection of the central conductor and insulator supports therefor, slidable covers such as slidable covers 122 and 128 are provided between bus enclosures where slidable cover 122 extends between enclosures 98 and 100, while cover 128 which extends between enclosures 100 and 102 is moved back to expose the bus.

The slidable covers have a diameter which is greater than the diameter of the bus enclosures so that it may be telescoped into one of the adjacent covers when it is opened.

For carrying these enclosure covers, and as shown in FIGURE 9, the left-hand ends of the bus enclosures, such as enclosures 100 and 102, are provided with a movable flange 124. The right-hand end of each bus enclosure 98 and 100 is also provided with a flange 126 which is welded directly to the enclosure. The cover, such as right-hand cover 128 of FIGURE 8 which has been opened to its right-hand position is provided with similar flanges 130 and 132 which cooperate with flanges 126 and 124 respectively of the enclosures 100 and 102.

In order to secure cover 128 in position, as shown for cover 122 in an airtight manner, a locking ring 134, shown in FIGURE 9 in cross-section and shown in FIGURE 8 for cover 122, is placed over the abutting flanges, such as flanges 124 and 132, and is then locked into place, drawing the flanges 124 and 132 into engagement over a triangular-shaped annular gasket 136, which assures the airtight joint. In order to remove the cover, locking ring 134 is removed and cover 128 is drawn to the right, pushing the flange 124 along the housing.

In order to assure electrical continuity through the enclosures 98, 100 and 102, conductive straps, such as straps 138 and 140 for cover 122 are provided. Structurally, it is this electrical connection in the generator circuit that distinguishes the present structure from the prior art devices. That is to say, in the prior art, the enclosures 98, 100 and 102 were purposely electrically insulated from one another and from the generator circuit. In the case of the present invention, however, these enclosures are purposely electrically connected as by conductive strap means which electrically connect the enclosures through the slidable enclosure covers.

Although I have described preferred embodiments of my novel invention, many variations and modifications will now be obvious to those skilled in the art, and I prefer therefore to be limited not by the specific disclosure herein but only by the appended claims.

I claim:
1. In an isolated phase bus system; a generator, an isolated phase bus, and a load; said isolated phase bus comprising a central bus conductor and a cylindrical housing therefor; said isolated phase bus being completely immersed in air and having an air space between said bus conductor and said housing, said cylindrical housing being of conductive material and having a cross-sectional area and configuration to impart rigidity to said housing; said housing being comprised of plurality of sections to permit access to the interior thereof; each of said sections being electrically tied together to form a series path; said cylindrical housing being electrically continuous along its complete length; electrical connections for said generator, said bus conductor and said load to transmit current from said generator through said bus conductor to said load; and further electrical connections for said generator and said cylindrical housing to pass a current equal to said current in said bus conductor but opposite in direction through said electrically continuous cylindrical housing; said bus conductor and said housing being electrically connected in series.

2. In an isolated phase bus system; a generator, an isolated phase bus, and a load; said isolated phase bus comprising a central bus conductor and a cylindrical housing therefor; said cylindrical housing being of conductive material and having a cross-sectional area and configuration to impart rigidity to said housing; said cylindrical housing being electrically continuous along its complete length; electrical connections for said generator, said bus conductor and said load to transmit current from said generator through said bus conductor to said load; and further electrical connections for said generator and said cylindrical housing to pass a current equal to said current in said bus conductor but opposite in direction through said electrically continuous cylindrical housing; said further electrical connections including transformer means for coupling return conductor means of said generator and said cylindrical housing means; said housing being comprised of plurality of sections to permit access to the interior thereof; each of said sections being electrically tied together to form a series path.

3. A multiphase isolated phase bus system comprising; a multiphase generator; a plurality of isolated phase buses for each of said multiphases, and a multiphase load; each of said isolated phase buses comprising a central bus conductor and a cylindrical housing therefor; said cylindrical housing being of conductive material and having a cross-sectional area and configuration to impart rigidity to said housing; said housing being comprised of plurality of sections to permit access to the interior thereof; each of said sections being electrically tied together to form a series path; said cylindrical housing being electrically continuous along its complete length; electrical connections for said multiphase generator, said bus conductors and said multiphase load to transmit current from each phase of said multiphase generator or through a respective bus conductor to a respective phase of said load; and further electrical connections for said multiphase generator and said cylindrical housings to pass a current through each cylindrical housing of a corresponding phase which is equal and opposite to the current flowing through the bus conductor encompassed by said last mentioned cylindrical housing; said bus conductors and said housings of respective phases being electrically connected in series.

4. An isolated phase bus housing comprising a first, a second, a third and a fourth hollow housing of conductive material; said first, second and third hollow housings being coaxially positioned with respect to one another; each of said first, second and third hollow housings having respective first and second ends; said second end of said first housing being positioned adjacent said first end of said second housing and being electrically connected thereto; said second end of said second housing being positioned adjacent said first end of said third housing and being mechanically and electrically connected thereto; said second end of said third housing being positioned adjacent said first end of said fourth housing and being mechanically and electrically secured thereto; said housing defining a continuous path for electrical current from said first end of said first housing through said second housing and said third housing to said second end of said fourth housing; a conductor positioned concentric to and within said isolated phase bus housing and being magnetically coupled thereto; said bus housing and said conductor being provided for each phase of a multiphase system; said housings for each phase being electrically tied to each other to thereby permit current to flow in only one direction at any one instant in any one of said bus housings.

References Cited in the file of this patent
UNITED STATES PATENTS

| | | |
|---|---|---|
| 1,603,849 | Hornby | Oct. 19, 1926 |
| 2,892,012 | Swedlow et al. | June 23, 1959 |

UNITED STATES PATENT OFFICE

CERTIFICATE OF CORRECTION

Patent No. 3,046,422                          July 24, 1962

Roy H. Albright

It is hereby certified that error appears in the above numbered patent requiring correction and that the said Letters Patent should read as corrected below.

Column 7, line 6, for "mid" read -- said --.

Signed and sealed this 29th day of January 1963.

(SEAL)
Attest:

ERNEST W. SWIDER                              DAVID L. LADD
Attesting Officer                                   Commissioner of Patents